(12) United States Patent
Oesterling et al.

(10) Patent No.: US 7,092,799 B2
(45) Date of Patent: Aug. 15, 2006

(54) METHOD AND SYSTEM FOR REMOTELY INVENTORYING ELECTRONIC MODULES INSTALLED IN A VEHICLE

(75) Inventors: Christopher L. Oesterling, Troy, MI (US); Dennis L. Zoeckler, Brighton, MI (US); Thomas A. Gawlik, Rochester Hills, MI (US); Nathan D. Ampunan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 294 days.

(21) Appl. No.: 10/683,716

(22) Filed: Oct. 10, 2003

(65) Prior Publication Data

US 2005/0080519 A1 Apr. 14, 2005

(51) Int. Cl.
*G05D 1/00* (2006.01)
(52) U.S. Cl. .............. 701/1; 701/29; 701/32; 701/33; 701/36
(58) Field of Classification Search .............. 701/1, 701/29, 207, 213, 33, 34, 35, 36, 32; 340/99, 340/425.5–490; 455/426.1–455.6
See application file for complete search history.

(56) References Cited

U.S. PATENT DOCUMENTS

| 6,728,612 | B1 * | 4/2004 | Carver et al. ................. 701/33 |
| 6,807,469 | B1 * | 10/2004 | Funkhouser et al. .......... 701/33 |
| 6,819,236 | B1 * | 11/2004 | Kawai et al. .......... 340/539.24 |
| 6,853,910 | B1 * | 2/2005 | Oesterling et al. ........... 701/207 |
| 6,933,842 | B1 * | 8/2005 | Oesterling et al. ..... 340/539.24 |
| 6,965,326 | B1 * | 11/2005 | Allison ....................... 340/999 |

* cited by examiner

*Primary Examiner*—Richard M. Camby
(74) *Attorney, Agent, or Firm*—Cardinal Law Group

(57) ABSTRACT

The invention provides a method and system for remotely inventorying electronic modules installed in a vehicle. A vehicle telematics unit sends an identification request to at least one electronic module. The telematics unit receives at least one electronic module identifier in response to the request. The identifier includes the serial number and software revision for the electronic module. The received identifier is transmitted from the telematics unit to a call center. The call center, or a quality center to which the call center sends the transmitted identifier, determines if the transmitted identifier corresponds with an identifier included in an electronic module identifier database. The database includes an identifier for each module that is intended to be installed in the vehicle. A quality assurance notice is sent based on the determination, indicating either that the correct module is installed in the vehicle or that an incorrect module must be replaced.

21 Claims, 5 Drawing Sheets

METHOD AND SYSTEM FOR REMOTELY INVENTORYING ELECTRONIC MODULES INSTALLED IN A VEHICLE

FIELD OF THE INVENTION

This invention relates generally to data transmission over a wireless communication system. More specifically, the invention relates to a method and system for remotely inventorying electronic modules installed in a vehicle.

BACKGROUND OF THE INVENTION

Modern vehicles often include more than 20 electronic modules associated with various circuits, components, and systems. Each module has a serial number, designating the module as being intended for use with, for example, an antilock brakes system or powertrain control, as well as a software revision identifier. The serial number and software revision identifier can be extracted via the vehicle bus. This involves plugging a scan tool into the vehicle computer system or by another direct, physical connection to the vehicle.

The serial number for each electronic module is unique. This allows an individual module to be tracked to ensure that the correct module is installed in a vehicle. The software revision identifier is included to ensure that each electronic module is equipped with software that is compatible with the software of all other electronic modules installed in the vehicle.

Occasionally, however, an erroneous electronic module is installed in a vehicle. On occasion, an electronic module may inadvertently fail to be installed by a service center. If the vehicle does not operate at all because of the incorrect module, the error is easily detected. However, if the vehicle operates but at a somewhat reduced level of efficiency because, for example, the software revision of the module is incorrect or the module is reconditioned or otherwise inferior to the intended module, this is less easy to detect.

In a manufacturing facility, physically extracting the serial number and software revision identifier for each electronic module installed and individually comparing each identifier with a list of vehicle design components is time consuming and adds to the cost of the vehicle. When a module is replaced in a vehicle repair facility, the technician performing the service may not know which part was inventoried for a particular warranty repair, in which case extracting the identifier cannot provide additional security that the correct part was installed.

Wireless communication services for mobile vehicles, such as navigation and roadside assistance, have been available for some time. Currently, vehicle information and information pertaining to a vehicle's location can be collected and stored using such systems. This data is occasionally uploaded to a central data repository such as a call center for analysis.

A method is needed that combines the convenience of wireless communications data collection with the capability to extract vehicle electronic module identification data, thus allowing the electronic modules installed in a vehicle to be remotely inventoried. Such a method would aid in promptly identifying an electronic module that had been installed in error during manufacture or repair of the vehicle, offering the vehicle's driver the convenience and potential cost savings of never having to deal with an incorrect module. The method could also reduce warranty costs for the vehicle's manufacturer. Therefore, it would be desirable to provide a method and system for remotely inventorying electronic modules installed in a vehicle that offers the above benefits and overcomes the aforementioned and other disadvantages.

SUMMARY OF THE INVENTION

One aspect of the invention provides a method for remotely inventorying electronic modules installed in a vehicle. A vehicle telematics unit sends an identification request to at least one electronic module. The telematics unit receives at least one electronic module identifier in response to the identification request. The received electronic module identifier is then transmitted from the telematics unit to a call center.

Another aspect of the invention provides a computer-usable medium including a program for remotely inventorying electronic modules installed in a vehicle. The program includes computer program code for sending an identification request from a telematics unit to at least one electronic module, receiving at least one electronic module identifier at the telematics unit in response to the identification request, and transmitting the electronic module identifier from the telematics unit to a call center.

Yet another aspect of the invention provides a system for remotely inventorying electronic modules installed in a vehicle. The system includes means for sending an identification request from a telematics unit to at least one electronic module, receiving at least one electronic module identifier at the telematics unit in response to the identification request, and transmitting the electronic module identifier from the telematics unit to a call center.

The aforementioned, and other features and advantages of the invention, will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
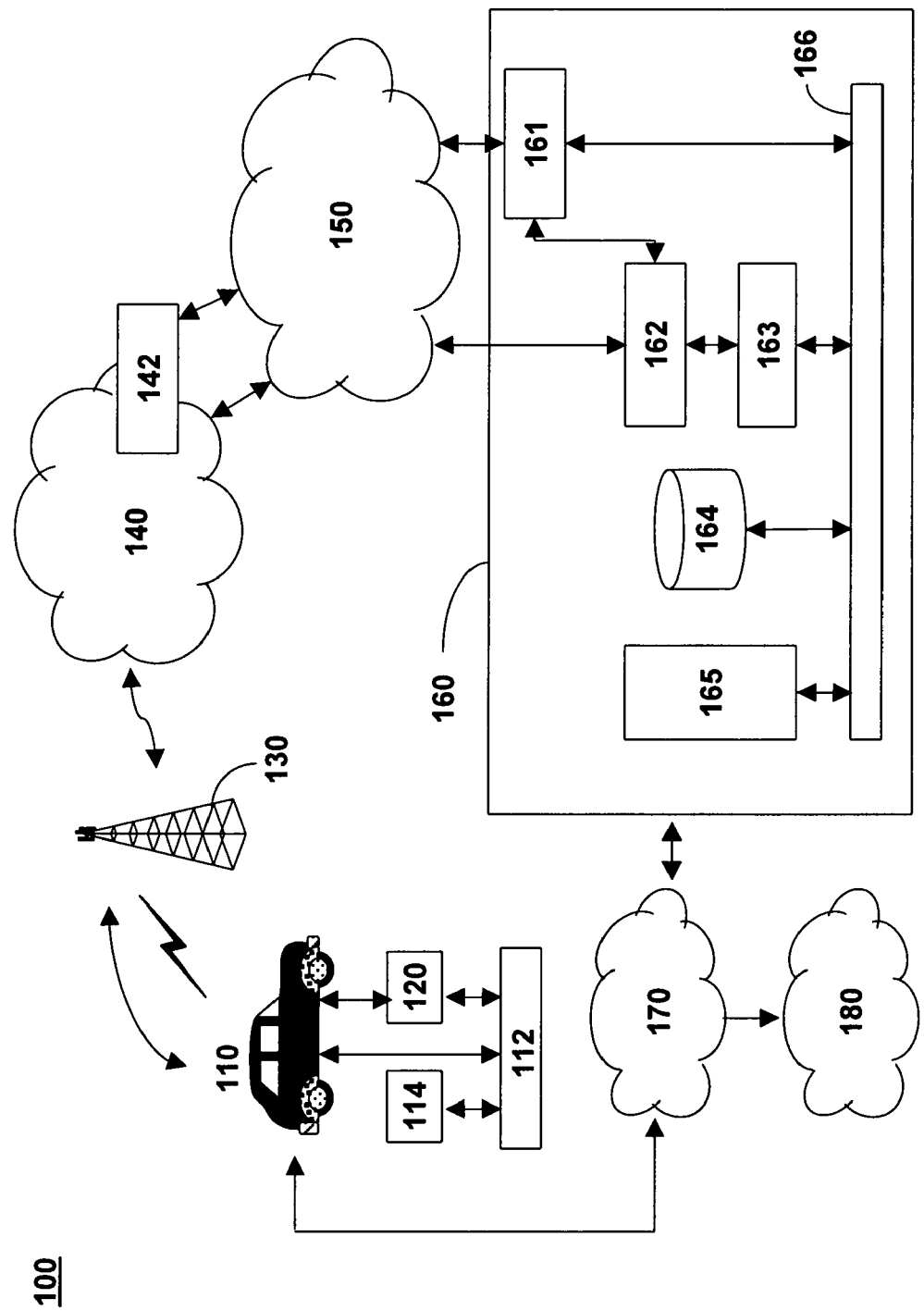
FIG. 1 is an illustration of one embodiment of a system for remotely inventorying electronic modules installed in a vehicle, in accordance with the present invention.

FIG. 1 shows an illustration of one embodiment of a system for remotely inventorying electronic modules installed in a vehicle, in accordance with the present invention at 100.

Electronic module inventorying system 100 includes a mobile vehicle 110, an in-vehicle telematics unit 120, one or more wireless carrier systems 130, one or more communication networks 140, one or more short message service centers 142, one or more land networks 150, one or more call centers 160, one or more quality centers 170, and one or more electronic module installation centers 180.

Mobile vehicle 110 includes a vehicle communication bus 112 connected to one or more vehicle electronic modules 114. Vehicle communication bus 112 is also connected to telematics unit 120. Thus, electronic module identifiers can be transmitted from their electronic modules 114 to telematics unit 120 via vehicle communication bus 112.

Telematics unit 120 includes, for example, a digital signal processor connected to a wireless modem, a global positioning system (GPS) unit, an in-vehicle memory, a microphone, one or more speakers, and a wireless communication device such as an analog, digital, dual-mode, dual-band, multi-mode or multi-band cellular phone. The digital signal processor (DSP) generates and accepts digital signals, such as those representing electronic module identifiers, that are transmitted between telematics unit 120 and vehicle communication bus 112 or between telematics unit 120 and call center 160. The DSP, for example, is a microprocessor, microcontroller, microcomputer, ASIC or any other appropriate computing device. In other embodiments, the DSP is a functional block of any similar computing device.

Telematics unit 120 includes suitable software for receiving and transmitting data communications and for performing other routines and requested services. In the present embodiment, telematics unit 120 receives communications from and transmits communications to call center 160 through wireless carrier system 130, communication network 140, and land network 150. In an alternative embodiment, one or more of the intermediate connections between telematics unit 120 and call center 160 is eliminated.

Wireless carrier system 130 is any suitable system for transmitting a signal from mobile vehicle 110 to communication network 140 and includes one or more short message service centers 142 that prescribe alphanumeric short messages to and from mobile vehicles 110. Short message service center 142 stores and buffers the messages and includes message entry features, administrative controls, and message transmission capabilities. Short message services include other telematic services such as broadcast services, time-driven message delivery, autonomous message delivery, and database-driven information services.

Communication network 140 is any suitable system or collection of systems for connecting wireless carrier system 130 to mobile vehicle 110 and to land network 150. In the present embodiment, communication network 140 comprises services from more than one mobile telephone switching office and wireless network. In an alternative embodiment, communication network 140 comprises services from a single mobile telephone switching office or wireless network.

Land network 150 is a public-switched telephone network (PSTN) and comprises a wired network, an optical network, a fiber network, another wireless network, or any combination thereof. Land network 150 is connected to one or more landline telephones and connects communication network 140 to call center 160. In an alternative embodiment, land network 150 connects a first wireless carrier system 130 with a second wireless carrier system 130. In one or more embodiments, land network 150 comprises an Internet protocol (IP) network.

Call center 160 is a location where many calls are received and serviced at the same time, and from which many calls are sent at the same time. In the present embodiment, the call center contains the functions of both a telematics call center, facilitating communications to and from mobile vehicle 110, and a voice call center, providing verbal communications between an advisor in the call center and a subscriber in a mobile vehicle. In an alternative embodiment, the call center contains only the function of a telematics call center. Call center 160 includes one or more voice and data switches 161, one or more data transmission devices 162, one or more communication services managers 163, one or more communication services databases 164, one or more advisors 165, and one or more network 166.

One or more switches 161 are connected to land network 150 and receive a modem signal from an analog or digital modem. Switch 161 is capable of transmitting either voice or data transmissions from a communication node and of receiving voice or data transmissions from mobile vehicle 110 through wireless carrier system 130, communications network 140, and land network 150. Switch 161 receives data transmissions from or sends data transmissions to data transmission device 162 and receives voice transmissions from or sends voice transmissions to advisor 165 via network 166.

Data transmission device 162 is capable of sending data to or receiving data from switch 161 and is, for example, an IP router or a modem. Data transmission device 162 transfers data to or from one or more advisors 165, one or more communication services managers 163, one or more communication services databases 164, and any other device connected to network 166. Data transmission device 162 conveys information received from communication network 140 to one or more communication services manager 163.

Communication services manager 163 is connected to switch 161, data transmission device 162, and advisor 165 through network 166. The call center contains any combination of hardware or software facilitating data transmissions between call center 160 and mobile vehicle 110 and between call center 160 and a quality center 170.

Communication services manager 163 receives information from mobile vehicle 110 through one or more of wireless carrier system 130, communication network 140, land network 150, and data transmission device 162. Communication services manager 163 sends information to mobile vehicle 110 through one or more of data transmission device 162, land network 140, communication network 130, and wireless carrier system 120. Communication services manager 163 provides information to mobile vehicle 110 from communication services database 164.

Communication services database 164 contains records on one or more mobile vehicles 110. Examples of records in communication services database 164 include vehicle identification, location information, status information, recent action information regarding mobile vehicle 110, a list of vehicle design components, intended replacement parts for mobile vehicle 110, and electronic module identifiers received from mobile vehicle 110. Communication services database 164 provides information and other support to communication services manager 163.

In the present embodiment, advisor 165 includes both a real advisor, such as a human being in verbal communication with telematics unit 120, and a virtual advisor, such as a synthesized voice interface responding to requests from telematics unit 120. In an alternative embodiment, advisor 165 is either a human advisor or a virtual of advisor. Advisor 165 communicates with telematics unit 120 in mobile vehicle 110 through wireless carrier system 130, communication network 140, and land network 150 using voice transmissions, or through communication services manager 163 and switch 161 using data transmissions.

Advisor 165 provides services to telematics unit 120 of vehicle 110. Advisor 165 communicates with communication services manager 163 or any other device connected to network 166. Services provided by communication services advisor 165 include, for example, enrollment services, navigation assistance, real-time traffic advisories, directory assistance, roadside assistance, business or residential assistance, information services assistance, emergency assistance, and communications assistance.

In the present embodiment, services provided by advisor 165 include determining if a transmitted electronic module identifier received from telematics unit 120 corresponds with an electronic module identifier included on a design component list or a list of intended replacement parts and sending a quality assurance notification from the call center based on the determination. Call center 160 is connected to one or more quality centers 170, which are the recipients of the quality assurance notification. Quality center 170 is, for example, a manufacturer's quality control department or a vehicle warranty center.

Quality center 170 is connected to one or more electronic module installation centers 180 and, in one or more embodiments, transmits information regarding the quality assurance notification from quality center 170 to installation center 180. Installation center 180 is, for example, a vehicle manufacturing line or a vehicle repair facility.

Figure 2:
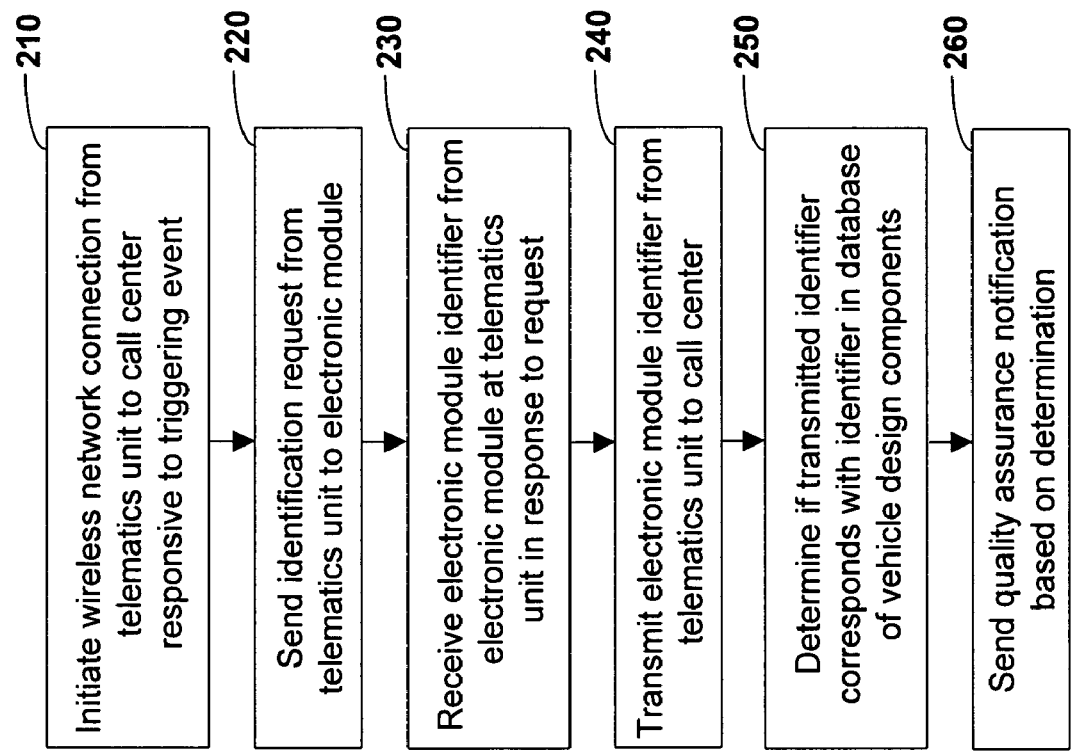
FIG. 2 is a flow diagram of one embodiment of a method for remotely inventorying electronic modules installed in a vehicle using the system of FIG. 1 in accordance with the present invention.

Another aspect of the present invention is a method for remotely inventorying electronic modules installed in a vehicle. FIG. 2 shows a flow diagram of one embodiment in accordance with the present invention at 200, using an example system as in FIG. 1. The method is used to ensure the correct electronic modules have been installed in a vehicle during manufacture.

In the present embodiment, the vehicle telematics unit is programmed during manufacture of the vehicle to initiate a wireless network connection from the telematics unit to a call center responsive to a triggering event (Block 210). The triggering event is, for example, a specified number of ignition cycles or a specified period of time following a particular ignition cycle. Once the connection is achieved, the vehicle telematics unit sends an identification request to one or more electronic modules installed in the vehicle (Block 220). The telematics unit communicates the identification request, which is a request for an electronic module to identify itself to the telematics unit, to each module via a vehicle communication bus. In the present embodiment, the identification request is initiated automatically by the telematics unit. In an alternative embodiment, it is initiated by a command from the call center.

In response to the identification request, the vehicle telematics unit receives an electronic module identifier from each electronic module via the vehicle communication bus (Block 230). In the present embodiment, the electronic module identifier includes not only a part serial number to identify the module but also a software revision number to ensure that all of the modules installed in the vehicle have compatible software.

As the electronic module identifiers are received at the vehicle telematics unit, they are immediately transmitted to the call center via the wireless network (Block 240). Some modules require that the vehicle be running in order for the module to respond, thus requiring more than one connection to be made between the telematics unit and the call center if the vehicle is shut down during the request, response, and transmission process.

The electronic module identifiers that have been transmitted from the vehicle are compared with electronic module identifiers included in an electronic module identifier database to determine if the two sets of identifiers correspond, meaning match identically (Block 250). In the present embodiment, the database is a design component list for the vehicle. An identical match indicates that the correct modules have been installed. The transmitted electronic module identifiers are sent from the call center to a quality center, for example the vehicle manufacturer's quality control department, which makes the determination as to whether the transmitted set of identifiers corresponds with identifiers included on the vehicle's design component list. In an alternative embodiment, the comparison is carried out at the call center by one or both of a human being or a computer algorithm.

A quality assurance notification is then sent based on the determination (Block 260). The notification states, for example, that all of the modules installed are correct or that certain incorrect modules must be replaced. In the present embodiment, the notification is sent directly from the quality center to the installation center, which is, in this example, a vehicle manufacturing line. In an alternative embodiment in which the determination is made at the call center, the notification is sent from the call center to the quality center and from the quality center to the manufacturing line. In yet another alternative embodiment, the quality center is an integral part of the manufacturing line.

Where the notification states that an incorrect module must be replaced, this can be done before the vehicle leaves the manufacturing facility. Where the notification states that all of the modules installed are correct, the notification allows the manufacturing facility to release the vehicle and provides a record that the vehicle includes the correct electronic modules.

Figure 3:
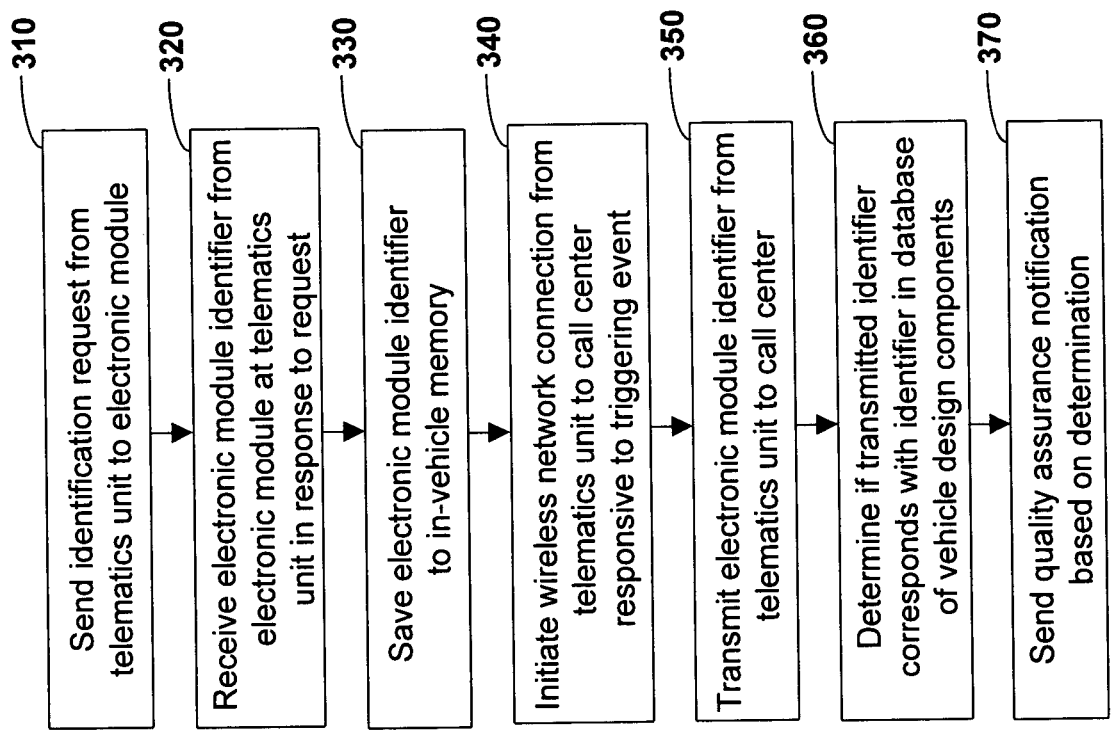
FIG. 3 is a flow diagram of another embodiment of a method for remotely inventorying electronic modules installed in a vehicle using the system of FIG. 1 in accordance with the present invention.

FIG. 3 at 300 shows a flow diagram of another embodiment in accordance with the present invention, using an example system as in FIG. 1. The method is again used to ensure the correct electronic modules have been installed in a vehicle during manufacture.

In this embodiment, the vehicle telematics unit is programmed during manufacture of the vehicle to send an identification request to one or more electronic modules installed in the vehicle in response to a triggering event such as a specified number of ignition cycles or a specified period of time following a particular ignition cycle (Block 310). The telematics unit communicates the identification request, which is a request for an electronic module to identify itself to the telematics unit, to each module via a vehicle communication bus.

In response to the request, the vehicle telematics unit receives an electronic module identifier from each electronic module via the vehicle communication bus (Block 320). In the present embodiment, the electronic module identifier includes not only a part serial number to identify the module but also a software revision number to ensure that all of the modules installed in the vehicle have compatible software. Some of the modules require that the vehicle be running in order for the modules to respond, thus requiring more than one identification request to be sent to a module if the vehicle is shut down during the request and response process.

The received identifiers are saved to an in-vehicle memory associated with the telematics unit (Block 330). Once all of the identifiers have been received into memory, the vehicle telematics unit initiates contact with a call center via a wireless network (Block 340). In an alternative embodiment, the call center initiates contact with the telematics unit. Once contact is achieved, the electronic module identifiers are transmitted from the telematics unit to the call center (Block 350).

The electronic module identifiers that have been transmitted from the vehicle are compared with electronic module identifiers included in an electronic module identifier database to determine if the two sets of identifiers correspond, meaning match identically (Block 360). In the present embodiment, the database is a design component list for the vehicle. An identical match indicates that the correct modules have been installed. The transmitted electronic module identifiers are sent from the call center to a quality center, for example the vehicle manufacturer's quality control department, which makes the determination as to whether the transmitted set of identifiers corresponds with identifiers included on the vehicle's design component list. In an alternative embodiment, the comparison is carried out at the call center by one or both of a human being or a computer algorithm.

A quality assurance notification is then sent based on the determination (Block 370). The notification states, for example, that all of the modules installed are correct or that certain incorrect modules must be replaced. In the present embodiment, the notification is sent directly from the quality center to the installation center, which is, in this example, a vehicle manufacturing line. In an alternative embodiment in which the determination is made at the call center, the notification is sent from the call center to the quality center and from the quality center to the manufacturing line. In yet another alternative embodiment, the quality center is an integral part of the manufacturing line.

Where the notification states that an incorrect module must be replaced, this can be done before the vehicle leaves the manufacturing facility. Where the notification states that all of the modules installed are correct, the notification allows the manufacturing facility to release the vehicle and provides a record that the vehicle includes the correct electronic modules.

Figure 4:
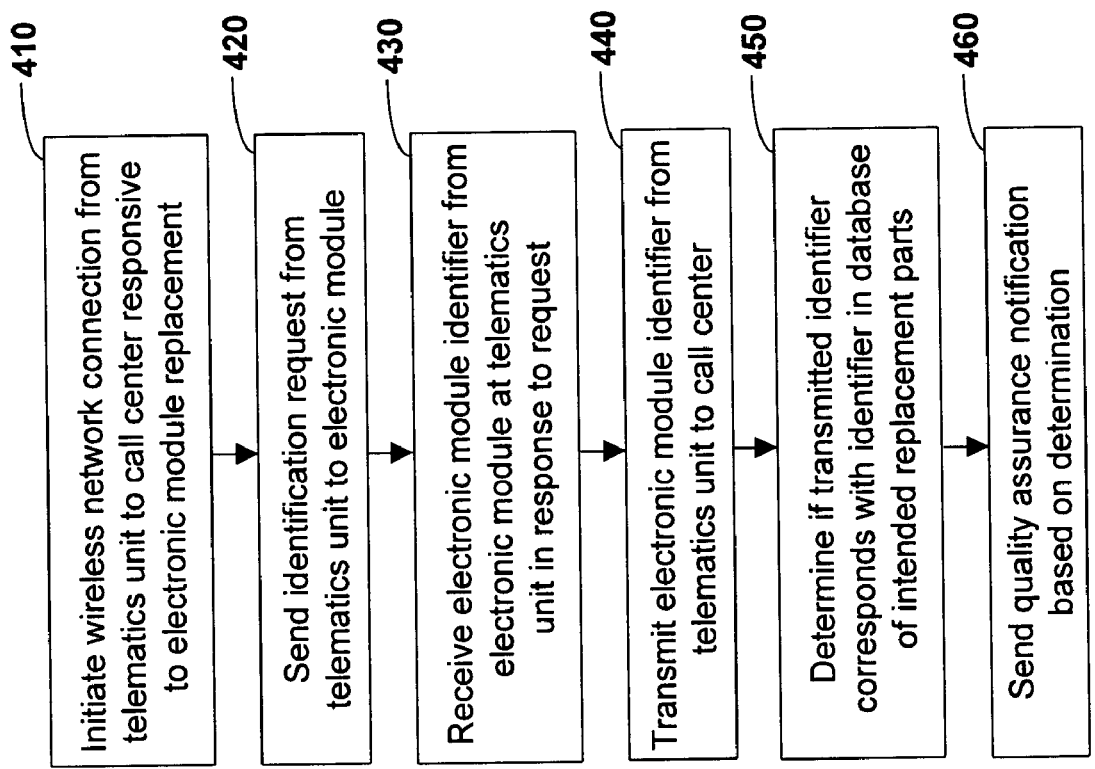
FIG. 4 is a flow diagram of yet another embodiment of a method for remotely inventorying electronic modules installed in a vehicle using the system of FIG. 1 in accordance with the present invention.

FIG. 4 shows at 400 a flow diagram of yet another embodiment in accordance with the present invention, using an example system as in FIG. 1. The method is used to ensure an electronic module installed during servicing of the vehicle is the correct replacement module for the vehicle.

The vehicle telematics unit is programmed to initiate a wireless network connection from the telematics unit to a call center responsive to a triggering event (Block 410). In the present embodiment, the triggering event is the replacement of one or more electronic modules during servicing of the vehicle. Once the connection is achieved, the vehicle telematics unit sends an identification request to one or more of the electronic modules installed in the vehicle (Block 420). The telematics unit communicates the identification request, which is a request for an electronic module to identify itself to the telematics unit, to each module via a vehicle communication bus. In the present embodiment, the identification request is initiated automatically by the telematics unit. In an alternative embodiment, it is initiated by a command from the call center.

In response to the identification request, the vehicle telematics unit receives an electronic module identifier from the electronic module via the vehicle communication bus (Block 430). In the present embodiment, the electronic module identifier includes not only a part serial number to identify the module but also a software revision number to ensure that all of the modules installed in the vehicle have compatible software.

As an electronic module identifier is received at the vehicle telematics unit, it is immediately transmitted to the call center via the wireless network (Block 440). Some modules require that the vehicle be running in order for the module to respond, thus requiring more than one connection to be made between the telematics unit and the call center if the vehicle is shut down during the request, response, and transmission process.

Each electronic module identifier transmitted from the vehicle is compared with electronic module identifiers included in an electronic module identifier database to determine if the two sets of identifiers correspond, meaning match identically (Block 450). An identical match indicates that the correct module has been installed. In the present embodiment, the transmitted electronic module identifier or identifiers are sent from the call center to a quality center, for example the vehicle manufacturer's quality control department or warranty department, which makes the determination. In an alternative embodiment, the comparison is carried out at the call center by one or both of a human being or a computer algorithm.

In the present embodiment, the electronic module identifier database includes electronic modules covered under a warranty or service contract, with the database created prior to shipment of the applicable parts to a repair facility. Comparing a transmitted electronic module identifier with identifiers in the database of intended replacement parts for the vehicle ensures that the part inventoried for replacement of the defective part under the warranty or service contract has, in fact, been installed on the vehicle.

A quality assurance notification is then sent based on the determination (Block 460). The notification states, for example, that all of the modules installed are correct or that certain incorrect modules must be replaced. In the present embodiment, the notification is sent directly from the quality center to the installation center, in this example, a vehicle repair facility. In an alternative embodiment in which the determination is made at the call center, the notification is sent from the call center to the quality center and from the quality center to the repair facility. In yet another alternative embodiment, the quality center is an integral part of the repair facility.

Where the notification states that an incorrect module must be replaced, this can be done before the vehicle leaves the vehicle repair facility, ensuring that the driver of the vehicle does not have to come back later to have the incorrect module replaced. Where the notification states that all of the installed modules are correct, the notification allows the vehicle repair facility to release the vehicle and provides a record that the vehicle includes the correct electronic modules.

Figure 5:
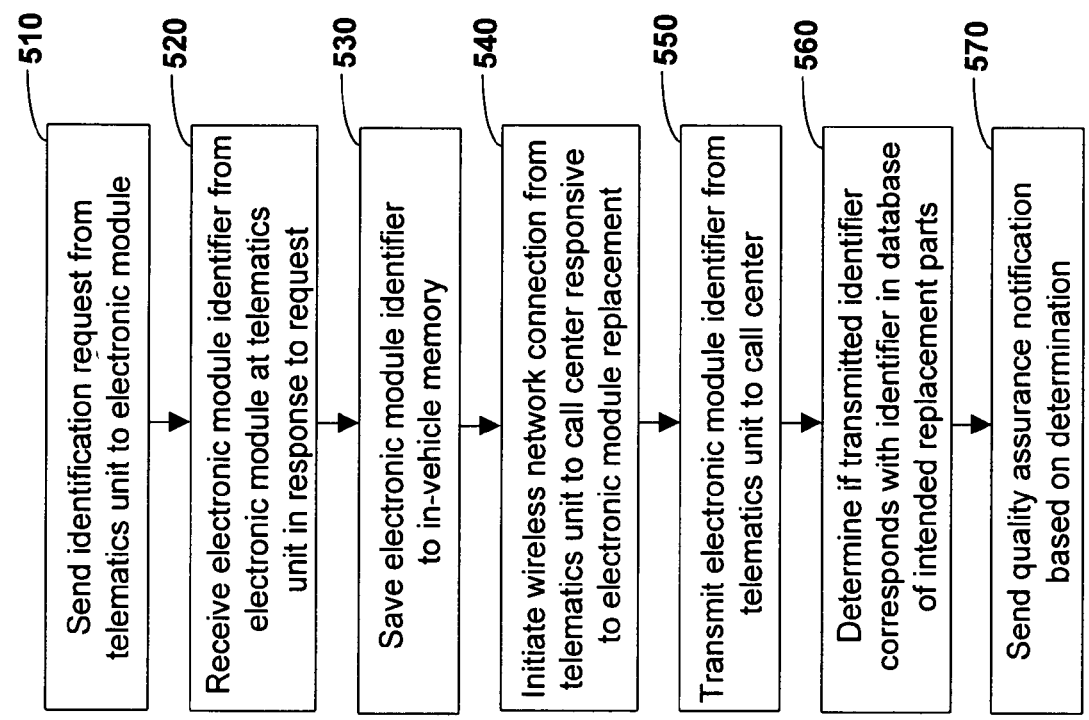
FIG. 5 is a flow diagram of still another embodiment of a method for remotely inventorying electronic modules installed in a vehicle using the system of FIG. 1 in accordance with the present invention.

FIG. 5 at 500 shows a flow diagram of still another embodiment in accordance with the present invention, using an example system as in FIG. 1. The method is again used to ensure an electronic module installed during servicing of the vehicle is the correct replacement module for the vehicle.

In this embodiment, the vehicle telematics unit is programmed to send an identification request to one or more electronic modules installed in the vehicle in response to a triggering event (Block 510). The triggering event is the replacement of one or more electronic modules during servicing of the vehicle. The telematics unit communicates the identification request, which is a request for an electronic module to identify itself to the telematics unit, to each module via a vehicle communication bus.

In another embodiment, the triggering event is the reaching of a predetermined odometer reading. In another embodiment, the triggering event is a predetermined odometer interval. For example, a predetermined odometer interval trigger triggers the telematics unit to initiate communication every 50 miles. The predetermined odometer interval is configurable by the call center. In another embodiment, the trigger may be a scalar time interval. For example, the lapse of one week triggers the telematics unit to initiate communication. In another example, the lapse of one month triggers the telematics unit. The time interval is also configurable by the call center. In another embodiment, a stand alone time interval is used to trigger the telematics unit. In another example, the trigger is controlled by the waking cycle (Drx) of the telematics unit.

In response to the request, the vehicle telematics unit receives an electronic module identifier from the electronic module via the vehicle communication bus (Block 520). In the present embodiment, the electronic module identifier includes not only a part serial number to identify the module but also a software revision number to ensure that all of the modules installed in the vehicle have compatible software. Some modules require that the vehicle be running in order for the module to respond, thus requiring more than one identification request to be sent to a module if the vehicle is shut down during the request and response process.

The received identifier or identifiers are saved to an in-vehicle memory associated with the telematics unit (Block 530). Once all applicable identifiers have been received into memory, the vehicle telematics unit initiates contact with a call center via a wireless network (Block 540). In an alternative embodiment, the call center initiates contact with the telematics unit. Once contact is achieved, the electronic module identifiers are transmitted from the telematics unit to the call center (Block 550).

Each electronic module identifier transmitted from the vehicle is compared with electronic module identifiers included in an electronic module identifier database to determine if the two sets of identifiers correspond, meaning match identically (Block 560). An identical match indicates that the correct module has been installed. In the present embodiment, the transmitted electronic module identifier or identifiers are sent from the call center to a quality center, for example the vehicle manufacturer's quality control department or warranty department, which makes the determination. In an alternative embodiment, the comparison is carried out at the call center by one or both of a human being or a computer algorithm.

In the present embodiment, the electronic module identifier database includes electronic modules covered under a warranty or service contract, with the database created prior to shipment of the applicable parts to a repair facility. Comparing a transmitted electronic module identifier with identifiers in the database of intended replacement parts for the vehicle maximizes the chance that the part inventoried for replacement of the defective part under the warranty or service contract has, in fact, been installed on the vehicle.

A quality assurance notification is then sent based on the determination (Block 570). The notification states, for example, that all of the modules installed are correct or that certain incorrect modules must be replaced. In the present embodiment, the notification is sent directly from the quality center to the installation center, in this example, a vehicle repair facility. In an alternative embodiment in which the determination is made at the call center, the notification is sent from the call center to the quality center and from the quality center to the repair facility. In yet another alternative embodiment, the quality center is an integral part of the repair facility.

Where the notification states that an incorrect module must be replaced, this can be done before the vehicle leaves the vehicle repair facility, ensuring that the driver of the vehicle does not have to come back later to have the incorrect module replaced. Where the notification states that all of the installed modules are correct, the notification allows the vehicle repair facility to release the vehicle and provides a record that the vehicle includes the correct electronic modules.

In practice, the described invention provides a portal into a vehicle that allows all electronic modules installed in the vehicle to be remotely inventoried using a telematics unit connected to the modules via a vehicle communication bus. Information obtained through the described method can identify a module that has been installed in error, for example an incorrect module or an otherwise correct module that has software incompatible with the software of other modules installed in the vehicle. An error can be identified and the electronic module replaced before the vehicle leaves a manufacturing or repair facility. This results in increased satisfaction for the customer, who never has to deal with an incorrect module installed in the vehicle. An additional benefit is reduced warranty costs for the manufacturer resulting from the ability to protect the life cycle of vehicles through installation of modules specifically manufactured for the vehicle to well-defined tolerances and specifications. The invention also ensures that as modules are replaced within a vehicle, the modules are traceable back to the ordering inventory.

While the embodiments of the invention disclosed herein are presently considered to be preferred, various changes and modifications can be made without departing from the spirit and scope of the invention. The scope of the invention is indicated in the appended claims, and all changes and modifications that come within the meaning and range of equivalents are intended to be embraced therein.

What is claimed is:

1. A method for remotely inventorying electronic modules installed in a vehicle, comprising:
    sending an identification request from a telematics unit to at least one electronic module;
    receiving at least one electronic module identifier at the telematics unit in response to the identification request;
    transmitting the electronic module identifier from the telematics unit to a call center; and
    receiving a quality assurance message from the call center responsive to the transmission of the electronic module identifier.

2. The method of claim 1 further comprising:
    determining if the transmitted electronic module identifier corresponds with an electronic module identifier included in an electronic module identifier database.

3. The method of claim 1 further comprising:
initiating a wireless network connection from the vehicle telematics unit to the call center responsive to a triggering event.

4. The method of claim 1 further comprising:
saving the at least one electronic module identifier to an in-vehicle memory.

5. The method of claim 1 wherein the identification request is initiated at the vehicle responsive to a triggering event.

6. The method of claim 5 wherein the triggering event is selected from a group consisting of a specified number of vehicle ignition cycles, a specified period of time following a particular ignition cycle, stand alone time, odometer readings, and a waking cycle.

7. The method of claim 1 wherein the electronic module identifier includes at least one of a pan serial number and a software revision number.

8. The method of claim 1 wherein the telematics unit communicates with the electronic module via a vehicle communication bus.

9. A computer readable medium including a program for remotely inventorying electronic modules installed in a vehicle, comprising:
computer program code for sending an identification request from a telematics unit to at least one electronic module;
computer program code for receiving at least one electronic module identifier at the telematics unit in response to the identification request;
computer program code for transmitting the electronic module identifier from the telematics unit to an electronic module identifier database; and
computer program code for receiving a quality assurance message from the electronic module identifier database responsive to the transmission of the electronic module identifier.

10. The computer readable medium of claim 9 further comprising:
computer program code for determining if the transmitted electronic module identifier corresponds with an electronic module identifier included in an electronic module identifier database.

11. The computer readable medium of claim 9 further comprising:
computer program code for initiating a wireless network connection from the vehicle telematics unit to the call center responsive to a triggering event.

12. The computer readable medium of claim 9 further comprising:
computer program code for initiating an identification request at the vehicle responsive to a triggering event.

13. The computer readable medium of claim 9 further comprising:
computer program code for saving the at least one electronic module identifier to an in-vehicle memory.

14. A system for remotely inventorying electronic modules installed in a vehicle, comprising:
means for sending an identification request from a telematics unit to at least one electronic module;
means for receiving at least one electronic module identifier at the telematics unit in response to the identification request; and
means for transmitting the electronic module identifier from the telematics unit to an electronic module identifier database; and
means for receiving a quality assurance message from the electronic module identifier database responsive to the transmission of the electronic module identifier.

15. The system of claim 14 further comprising:
means for determining if the transmitted electronic module identifier corresponds with an electronic module identifier included in an electronic module identifier database.

16. The system of claim 14 further comprising;
means for initiating an identification request at the vehicle responsive to a triggering event.

17. The system of claim 14 further comprising:
means for initiating a wireless network connection from the vehicle telematics unit to the electronic module identifier database responsive to a triggering event.

18. The method of claim 1 wherein the quality assurance notification states that the electronic modules associated with the electronic module identifier are correct or incorrect.

19. The medium of claim 9 wherein the quality assurance notification states that the electronic modules associated with the electronic module identifier are correct or incorrect.

20. The system of claim 14 wherein the quality assurance notification states that the electronic modules associated with the electronic module identifier are correct or incorrect.

21. A method for remotely inventorying electronic modules installed in a vehicle, comprising:
sending an identification request from a telematics unit to at least one electronic module responsive to replacement of at least one electronic module during vehicle servicing;
receiving at least one electronic module identifier at the telematics unit in response to the identification request; and
transmitting the electronic module identifier from the telematics unit to a call center.

* * * * *